(12) United States Patent
Aaron et al.

(10) Patent No.: US 10,491,470 B2
(45) Date of Patent: Nov. 26, 2019

(54) METHODS, SYSTEMS, AND PRODUCTS FOR NOTIFYING OF ENHANCEMENTS TO QUALITY OF SERVICE AND EXPERIENCE

(71) Applicant: AT&T Intellectual Property I, L.P., Atlanta, GA (US)

(72) Inventors: Jeffrey A. Aaron, Atlanta, GA (US); Cagatay Buyukkoc, Holmdel, NJ (US); Robert C. Streijl, Brighton, MA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 112 days.

(21) Appl. No.: 14/707,045

(22) Filed: May 8, 2015

(65) Prior Publication Data

US 2015/0244576 A1   Aug. 27, 2015

Related U.S. Application Data

(63) Continuation of application No. 13/214,269, filed on Aug. 22, 2011, now Pat. No. 9,053,487.

(51) Int. Cl.
*G06F 15/177* (2006.01)
*H04L 12/24* (2006.01)
*G06Q 30/02* (2012.01)
*H04L 29/08* (2006.01)
*H04L 29/06* (2006.01)

(52) U.S. Cl.
CPC ......... *H04L 41/0813* (2013.01); *G06Q 30/02* (2013.01); *H04L 41/5003* (2013.01); *H04L 67/303* (2013.01); *H04L 67/42* (2013.01)

(58) Field of Classification Search
CPC ..... H04L 47/10; H04L 47/762; H04L 47/805; H04L 47/822; H04L 47/2491; H04L 12/24; H04L 12/5695; H04L 41/0806; H04L 41/0896; H04L 41/5035
USPC ......... 709/217–219, 221, 224, 227, 229–230
See application file for complete search history.

(56) References Cited

U.S. PATENT DOCUMENTS

| | | |
|---|---|---|
| 6,522,629 B1 | 2/2003 | Anderson, Sr. |
| 7,283,803 B2 | 10/2007 | Karaoguz et al. |
| 7,356,487 B2 | 4/2008 | Kitze |
| 7,546,333 B2 | 6/2009 | Alon et al. |
| 7,577,908 B2 | 8/2009 | Frazier et al. |
| 8,311,688 B2 | 11/2012 | Smith et al. |
| 8,335,239 B2 | 12/2012 | Kafka et al. |
| 2002/0026509 A1 | 2/2002 | Wahl |

(Continued)

FOREIGN PATENT DOCUMENTS

| | | | | |
|---|---|---|---|---|
| WO | WO 0169444 A2 * | 9/2001 | ............. | G06F 17/30 |
| WO | WO-0169444 A2 * | 9/2001 | ............. | G06F 17/30 |
| WO | WO 2007/034387 | 3/2007 | | |

*Primary Examiner* — Farzana B Huq
(74) *Attorney, Agent, or Firm* — Scott P. Zimmerman, PLLC

(57) ABSTRACT

Methods, systems, and products notify users when changes in a communication network improve quality of service. When a service provider changes a configuration parameter in the communications network, a change to the configuration parameter is compared to a rule. When the change to the configuration parameter results in a perceivable improvement in quality of service, a notification is sent to a user's device. The notification informs the user's device of the improvement in quality of service caused by the change to the configuration parameter.

20 Claims, 17 Drawing Sheets

(56) References Cited

U.S. PATENT DOCUMENTS

| | | | |
|---|---|---|---|
| 2002/0194108 A1 | 12/2002 | Kitze | |
| 2003/0172151 A1* | 9/2003 | Schade | H04L 41/0893 709/224 |
| 2003/0194064 A1 | 10/2003 | Lee et al. | |
| 2004/0017585 A1* | 1/2004 | Makishima | G06F 21/608 358/1.18 |
| 2004/0268303 A1* | 12/2004 | Abe | G06F 8/74 717/108 |
| 2005/0131912 A1 | 6/2005 | Lin et al. | |
| 2005/0131982 A1* | 6/2005 | Yamasaki | G06F 9/505 709/200 |
| 2005/0226193 A1 | 10/2005 | Karhiniemi et al. | |
| 2005/0232284 A1 | 10/2005 | Karaoguz et al. | |
| 2005/0233728 A1 | 10/2005 | Karaoguz et al. | |
| 2006/0013233 A1* | 1/2006 | Trossen | H04L 67/24 370/401 |
| 2006/0173937 A1* | 8/2006 | Sia | G06F 8/71 |
| 2006/0222008 A1 | 10/2006 | Aaron et al. | |
| 2007/0281726 A1 | 12/2007 | Rey et al. | |
| 2007/0286213 A1 | 12/2007 | Fodor et al. | |
| 2008/0037525 A1 | 2/2008 | Karaoguz et al. | |
| 2008/0085717 A1 | 4/2008 | Chhabra et al. | |
| 2008/0181211 A1 | 7/2008 | Parolkar et al. | |
| 2009/0129405 A1 | 5/2009 | Lauwers | |
| 2009/0313367 A1 | 12/2009 | Alon et al. | |
| 2010/0020681 A1 | 1/2010 | Nakashima et al. | |
| 2010/0031157 A1 | 2/2010 | Neer et al. | |
| 2010/0058169 A1* | 3/2010 | Demant | G06F 17/248 715/234 |
| 2010/0272098 A1* | 10/2010 | Ferguson | H04L 12/66 370/352 |
| 2010/0333028 A1 | 12/2010 | Welsh | |
| 2011/0158092 A1 | 6/2011 | Levillain et al. | |
| 2011/0246867 A1* | 10/2011 | Tsutsumi | G06F 17/243 715/222 |
| 2011/0307524 A1* | 12/2011 | Aitken | G06F 17/30306 707/803 |
| 2011/0321172 A1* | 12/2011 | Maeda | G06F 21/10 726/27 |
| 2012/0054661 A1 | 3/2012 | Rados et al. | |
| 2012/0173682 A1 | 7/2012 | Mantere et al. | |
| 2012/0303795 A1* | 11/2012 | Mo | H04L 67/142 709/224 |
| 2013/0007143 A1* | 1/2013 | Rinard | G06Q 10/107 709/206 |
| 2013/0054766 A1 | 2/2013 | Aaron et al. | |
| 2013/0055136 A1 | 2/2013 | Aaron et al. | |

\* cited by examiner

FIG. 7

Do you wish to receive notifications from service provider? ● YES ○ NO

Please select the configuration parameters for notification:

○ Bandwidth    ○ Jitter    ○ Packet Delay    ○ Packet Loss
○ Display More Parameters Enter Threshold Improvement for Notification (Percentage) [10]

Do you wish to use Mean Opinion Scores? ● YES ○ NO

Please select applications for notification: ● All ○ Video ○ Messaging ○ Voice ○ Music ○ More

METHODS, SYSTEMS, AND PRODUCTS FOR NOTIFYING OF ENHANCEMENTS TO QUALITY OF SERVICE AND EXPERIENCE

CROSS-REFERENCE TO RELATED APPLICATIONS

This application is a continuation of U.S. application Ser. No. 13/214,269 filed Aug. 22, 2011 and since issued as U.S. Pat. No. 9,053,487, which is incorporated herein by reference in its entirety.

BACKGROUND

Exemplary embodiments generally relate to multiplex communications, telecommunications, computer data transfer, and to operator interfaces and, more particularly, to data admission, to path routing, to radio telephones, to computer networking, and to graphical user interfaces.

Advertising strives to persuade an audience. Advertising drives consumers to purchase some commercial offering. Conventional advertising, though, is unrelated to a consumer's current experience.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIG. 7 is a schematic illustrating custom notifications, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
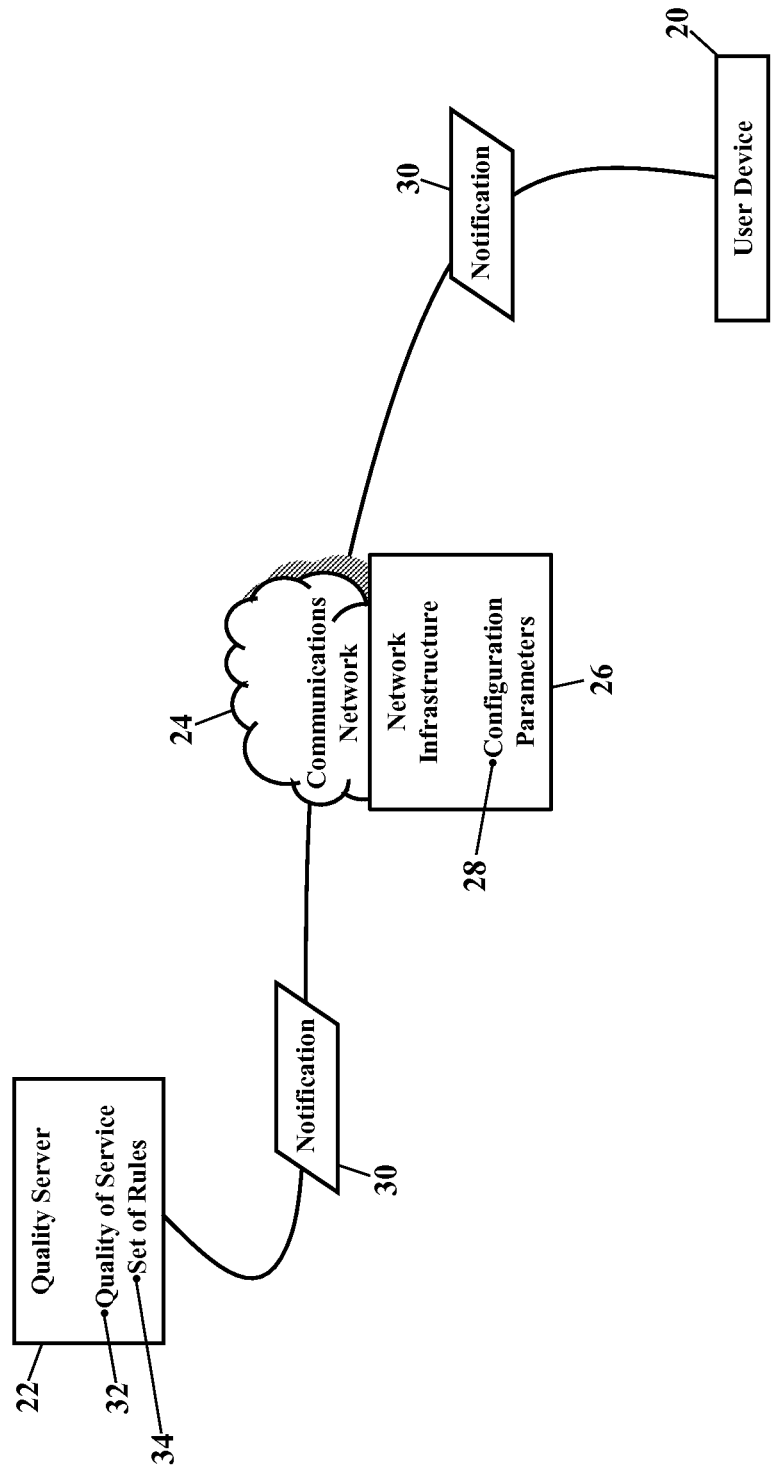
FIG. 1 is a simplified schematic illustrating an operating environment, according to exemplary embodiments.

FIG. 1 is a simplified schematic illustrating an operating environment, according to exemplary embodiments. A user device 20 communicates with a quality server 22 using a communications network 24. The quality server 22 determines when changes in the communications network 24 will improve the quality of the communication services provided to the user device 20. The quality server 22, in particular, is notified when a network infrastructure 26 makes changes to configuration parameters 28 in the communications network 24. The quality server 22 determines when the changes to the configuration parameters 28 are noticeable by a user of the user device 20. When the changes to the configuration parameters 28 are noticeable, the quality server 22 sends a notification 30 to the user device 20. The notification 30 informs the user device 20 of an improvement in quality 32 of service provided to the user device 20.

The notification 30 is preferably provided for noticeable enhancements. When the changes to the configuration parameters 28 would result in a perceivable or noticeable improvement in the quality 32 of service, the notification 30 may be sent. The notification 30, in other words, may not be provided for imperceptible changes. A slight increase in bandwidth, for example, may not be perceived by the user, so the notification 30 may not be sent. Indeed, if the user cannot noticeably perceive a slight increase in bandwidth connection speeds, the notification 30 may create a backlash in the community of users. Users may feel duped when the notification 30 harks insignificant changes. A set 34 of rules, then, may be implemented to ensure that the changes to the configuration parameters 28 are perceivable to users. The set 34 of rules specifies one or more rules that quantify perceptible ranges of changes to the configuration parameters 28. When a change in a configuration parameter 28 satisfies a rule in the set 34 of rules, then the notification 30 may be sent (as later paragraphs will explain).

The notification 30 may also coincide with the user's experience. Exemplary embodiments preferably provide users with an awareness that a service provider has improved a user's experience in a significant fashion, generally at the time such improvement has occurred or has been accomplished. The notification 30 is thus closely associated with what the user is actually doing at the time, or what the user was doing within a selected or configured reasonable previous time window.

The notification 30 is thus less expensive, and more effective, than traditional advertising. Traditional advertising aims to impress and influence the user, but traditional advertising is not timed with the user's current experience. Exemplary embodiments, in contradistinction, contemporaneously notify the user (at the user device 20) when a service provider is configuring communications services. The notification 30, for example, may inform the customer:

"The quality of your current video conference has just been improved two-fold by AT&T;"

"AT&T has just protected you from increasing network congestion;"

"AT&T has just taken actions to maintain your connection despite loss in signal strength;"

"AT&T has just modified your wireless signal to avoid interference;" or

"AT&T has upgraded you to faster service."

The notification 30 thus allows the user to immediately see, and to better recognize, the value of the communications services provide by the service provider. Exemplary embodiments thus allow quality of service and experience mechanisms to be much more effectively portrayed to customers. Because the user may immediately perceive enhancements to the quality of service and experience, the notification 30 thus helps the service provider pay for network improvements (such as added communications towers and other infrastructure). The notification 30 also helps reduce churn by increasing customer loyalty based on recognition of service provider efforts to continually improve service and to help the customer. The notification 30 thus provides a more personalized experience indicating that the service provider is constantly working to improve service. More importantly, exemplary embodiments forms mental associations in the user's mind that binds the service provider's efforts to perceivable improvements in service.

The notification 30 differs from traditional indicators. A signal strength icon, for example, is commonly found on many wireless devices. "Five bars" is commonly thought to indicate a strong signal, while "no bars" is thought to mean a weak or no signal. This icon, though, is only a crude estimation and not indicative of quality of service. Signal strength is not a measure of quality of service (such as bandwidth, jitter, packet loss, packet delay, quality of video reproduction, and other quality scores). The signal strength measurement is delayed and only measures average signal strength (e.g., typically averaged over a fifteen second window of time). The signal strength bar meter also fails to indicate interference or highly-dynamic dips in signal strength. The signal strength bar meter is thus not indicative of the user's current or recent activity/experience.

The notification 30 also differs from traditional speed tests. Some software applications have a feature that supposedly measures bandwidth. This feature is thought to measure an aspect of connection quality. These speed tests, though, are only valid with respect to a single test server (in a particular city) that receives a "ping" command. Connection quality to any other endpoint or destination is almost always grossly different. Moreover, packet timing to a single server, again, is not a measure of quality of service (connection bandwidth, jitter, packet loss, packet delay, and video reproduction). Traditional speed tests also only measure average connection bandwidth (e.g., typically averaged over a test file size and over a window of time that depends on how long the test file takes to transfer over the connection). Traditional speed tests cannot be done continuously since speed tests consume significant amounts of precious customer/user bandwidth and/or resources. Traditional speed tests thus do not correlate with the user's current or recent activity/experience. Moreover, the test server may be serving more than its capacity to handle simultaneous requests, and the test server may operate in network segments not part of a service provider's network. These connectivity issues may all lead to an overall problematic result that is beyond control of that service provider. Users thus have a false indication that the problem is with the service provider.

The notification 30 thus presents a new solution. When a service provider's actions or efforts benefit the user's experience, the service provider may send the notification 30. The notification 30 may be tailored to different scenarios, with different notifications 30 for different actions or efforts. The notification 30 is preferably sent at the moment when quality improvements are most noticeable, thus purposefully forming positive mental associations in the user's mind. The notification 30, for example is perhaps best sent when improvements in bandwidth are best noticed during download of a movie, or soon thereafter when the user is not busy. Users are perhaps best notified of reductions in packet loss when conducting an Internet call, or immediately thereafter once the user is not busy. Exemplary embodiments thus purposefully form, encourage, or even suggest an association between a service provider's actions and efforts and the user's experience. The notification 30 highlights or reinforces the user's perception and understanding of the service provider's actions and efforts. The notification 30, though, should not be intrusive, so the notification 30 may be presented at a bottom of a screen to minimize disruptions.

Figure 2:
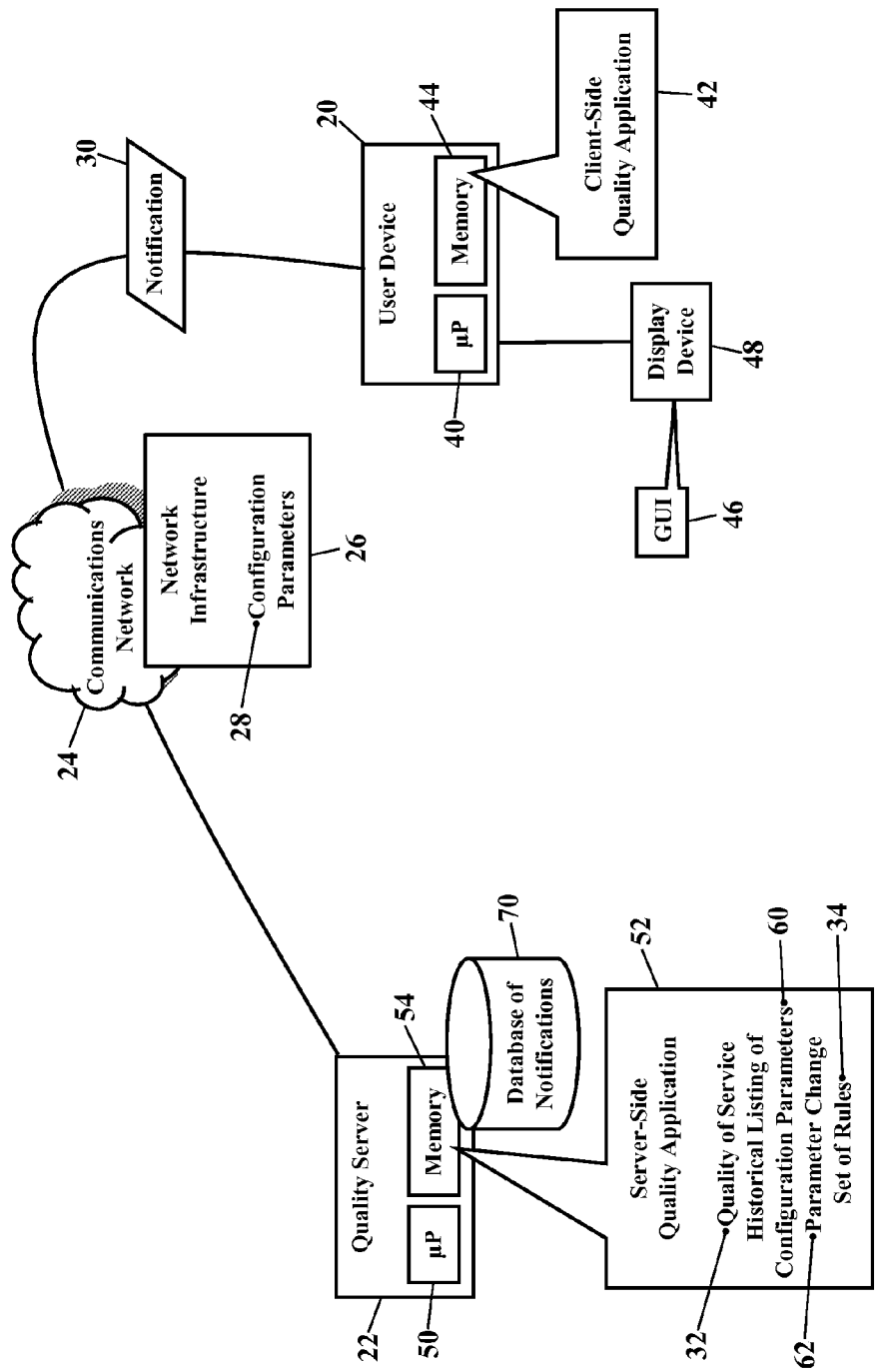
FIG. 2 is a more detailed schematic illustrating an operating environment, according to exemplary embodiments.

FIG. 2 is a more detailed schematic illustrating an operating environment, according to exemplary embodiments. Here the user device 20 and the quality server 22 cooperate to inform the user (at the user device 20) of noticeable enhancements to the quality 32 of service. The user device 20 may have a processor 40 (e.g., "µP"), application specific integrated circuit (ASIC), or other component that executes a client-side quality application 42 stored in a memory 44. The client-side quality application 42 may cause the processor 40 to produce a graphical user interface ("GUI") 46 on a display device 48, yet the graphical user interface 46 may also have audible features. The quality server 22 may also have a processor 50 (e.g., "µP"), application specific integrated circuit (ASIC), or other component that executes a server-side quality application 52 stored in a memory 54. The client-side quality application 42 and the server-side quality application 52 cooperate to inform the user, at the user device 20, of noticeable enhancements to the quality 32 of service.

The quality server 22 informs the user of perceivable enhancements in the quality 32 of service. As earlier paragraphs explained, the quality server 22 interfaces with the network infrastructure 26 of the communications network 24. The network infrastructure 26 makes changes to the configuration parameters 28 in the communications network 24. The network infrastructure 26 then informs the quality server 22 of those changes to the configuration parameters 28. The quality server 22 may maintain an historical listing 60 of configuration parameters. The historical listing 60 of configuration parameters is illustrated as being stored in the memory 54 of the quality server 22, but the historical listing 60 of configuration parameters may be stored, accessed, and queried from any location in the communications network 24. Regardless, when the network infrastructure 26 informs the quality server 22 of changes to the configuration parameters 28, the server-side quality application 52 may compare any changes in the configuration parameters 28 to the stored historical listing 60 of configuration parameters. The server-side quality application 52 determines a parameter change 62 in any configuration parameter 28. The server-side quality application 52 typically numerically determines how much any configuration parameter 28 has changed from a recent value in the stored historical listing 60 of configuration parameters.

The quality server 22 may then access the set 34 of rules. The set 34 of rules specifies one or more rules that quantify perceptible changes to the configuration parameters 28. The server-side quality application 52 compares the parameter change 62 in any configuration parameter 28 to a rule in the set 34 of rules. The set 34 of rules preferably quantifies what parameter change 62 in any configuration parameter 28 deserves the notification 30. If the parameter change 62 in any configuration parameter 28 satisfies one or more rules in the set 34 of rules, then the server-side quality application 52 may send the notification 30.

The set 34 of rules helps ensure changes are humanly noticeable. Most users do not want to be informed of insignificant changes and/or changes that are imperceptible. The set 34 of rules, then, preferably defines or quantifies changes that are humanly noticeable and that warrant the notification 30. If a change in the configuration parameters 28 results in a one percent (1%) increase in bandwidth (e.g., bits per second), this change may not be noticeable to most users. The set 34 of rules, then, may specify that only improvements of ten percent (10%) or more result in the notification 30. The set 34 of rules may specify a range of values for the parameter change 62 in any individual configuration parameter 28 that deserves the notification 30. The set 34 of rules may also specify ranges of values for changes in multiple configuration parameters 28. Rules may be conditional, such that decisions and output or actions are dependent upon various additional factors as may be desirable.

The set 34 of rules may be determined by any means. Some rules, for example, may be developed based on simulated or live testing. Other rules, however, may be based upon mathematical equations that calculate improvements, say in luminescence or other color factors. Still other rules may be developed based upon customer focus groups that seek to quantify noticeable changes in bandwidth, delay, or any other configuration parameters 28. However the set 34 of rules are determined, the set 34 of rules helps ensure changes are humanly noticeable and thus deserve the notification 30. The set 34 of rules may even be customized for particular users and/or user groups/profiles. User feedback may be incorporated such that rules may be continually modified/tweaked/optimized.

The quality server 22 may then retrieve the notification 30. When the parameter change 62 satisfies a rule in the set 34 of rules, the rule may also specify the notification 30 that is sent to the user device 20. The rule, in particular, may specify which of multiple, different notifications 30 are retrieved and sent to the user device 20. The rule may identify the notification 30 by filename, unique identifying number, or any other mechanism. Regardless, once the notification 30 is specified by the rule, the server-side quality application 52 may then consult a database 70 of notifications. The database 70 of notifications is illustrated as being locally stored in the quality server 22, but the database 70 of notifications may be remotely stored, accessed, and queried from any location in the communications network 24. The server-side quality application 52 queries the database 70 of notifications for the notification 30 specified by the rule in the set 34 of rules. The quality server 22 retrieves the notification 30 and sends the notification 30 to a communications address (e.g., Internet Protocol address or telephone number) associated with the user device 20. The notification 30 informs the user, at the user device 20, of the changes in the communications network 24 that enhance the user's quality of service. The notification 30 thus purposefully forms an association between a service provider's actions and efforts and the user's experience. The notification 30 highlights or reinforces the user's perception and understanding of the service provider's actions and efforts.

Figure 3:
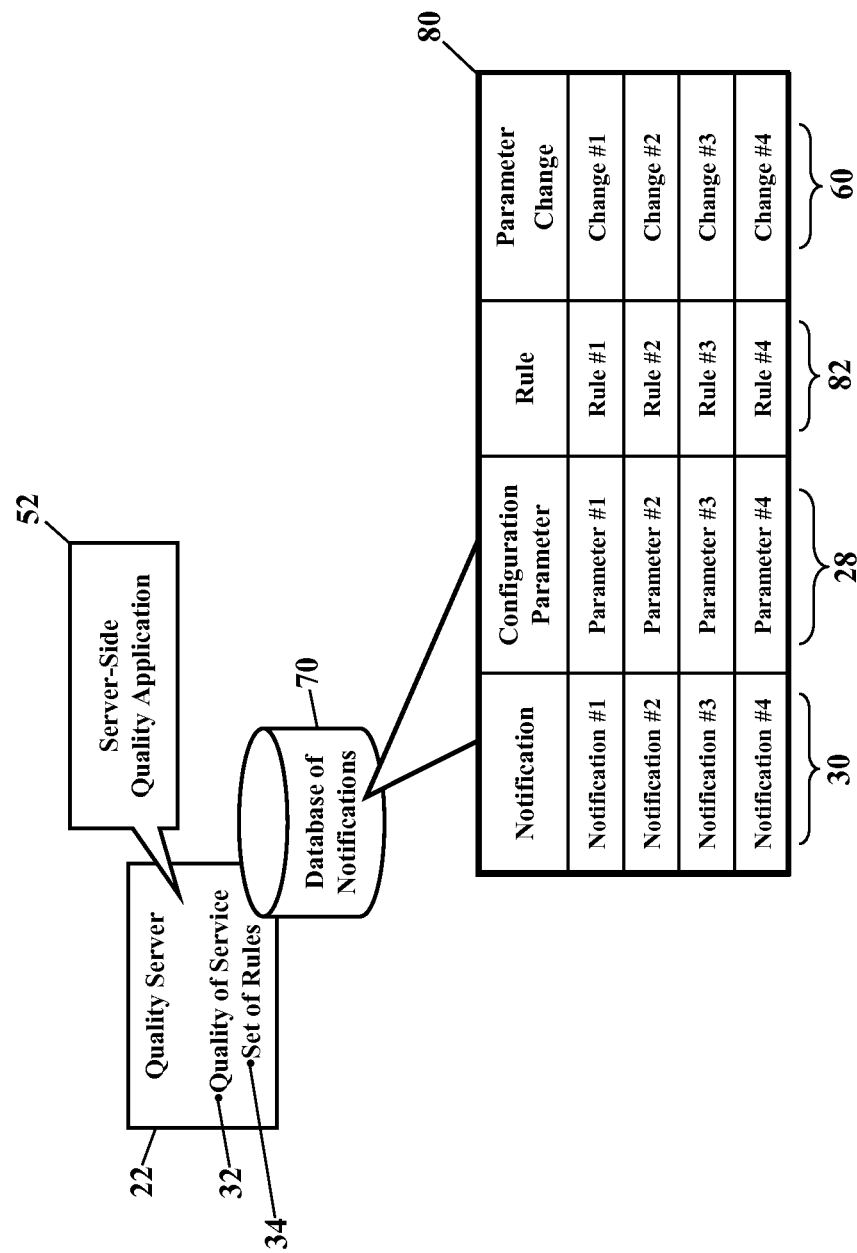
FIG. 3 is a detailed schematic illustrating a database of notifications, according to exemplary embodiments.

FIG. 3 is a more detailed schematic illustrating the database 70 of notifications, according to exemplary embodiments. Here the database 70 of notifications may establish many associations to different notifications 30. Exemplary embodiments, for example, may associate different notifications 30 to different configuration parameters 28. When the set 34 of rules requires the notification 30, the server-side quality application 52 may again consult the database 70 of notifications. Here, though, the database 70 of notifications determines which of multiple, different notifications 30 are retrieved and sent to the user device (illustrated as reference numeral 20 in FIGS. 1-2). The database 70 of notifications is illustrated as a table 80 that maps, relates, or otherwise associates the notifications 30 to different configuration parameters 28. Here the server-side quality application 52 queries the database 70 of notifications for the configuration parameter 28 that satisfied the set 34 of rules. The server-side quality application 52 retrieves the notification 30 associated with the configuration parameter 28. The server-side quality application 52 causes the quality server 22 to send the notification 30 to the user device 20. The notification 30 informs the user device 20 of the changes in the communications network 24 that enhance the user's quality 32 of service. The notification 30 again highlights or reinforces the user's perception and understanding of the service provider's actions and efforts.

Other associations may be established. As FIG. 3 also illustrates, the database 70 of notifications may map different notifications 30 to different rules 82 in the set 34 of rules. Notifications 30 may also be mapped to the parameter change 60 in any configuration parameter 28. When the set 34 of rules requires the notification 30, the server-side quality application 52 may query the database 70 of notifications for the rule 82 that triggered or required the notification 30. The server-side quality application 52, likewise, may query the database 70 of notifications for the parameter change 60 that required the notification 30. However the notification 30 is selected, the notification 30 is retrieved and sent to the user device 20.

Figure 4:
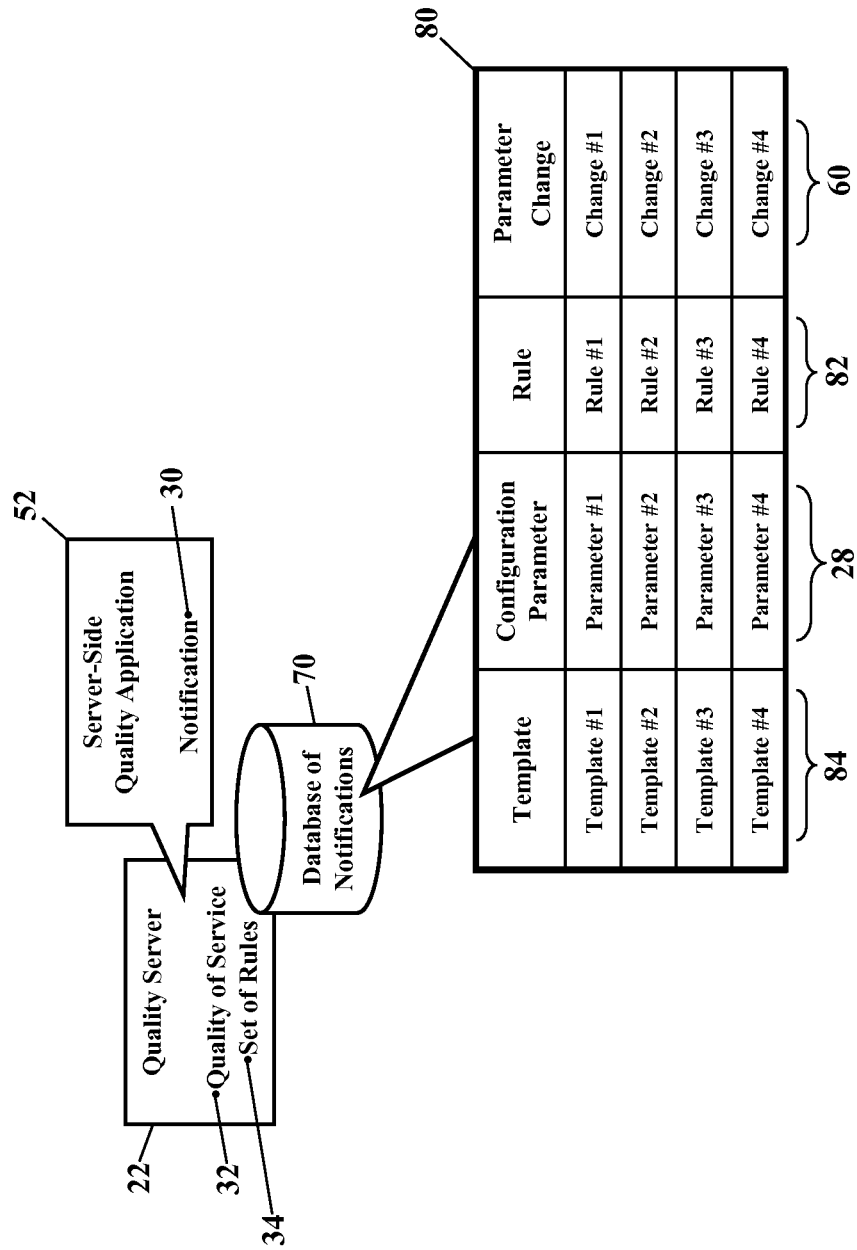
FIGS. 4-6 are schematics illustrating templates, according to exemplary embodiments.
Figure 5:
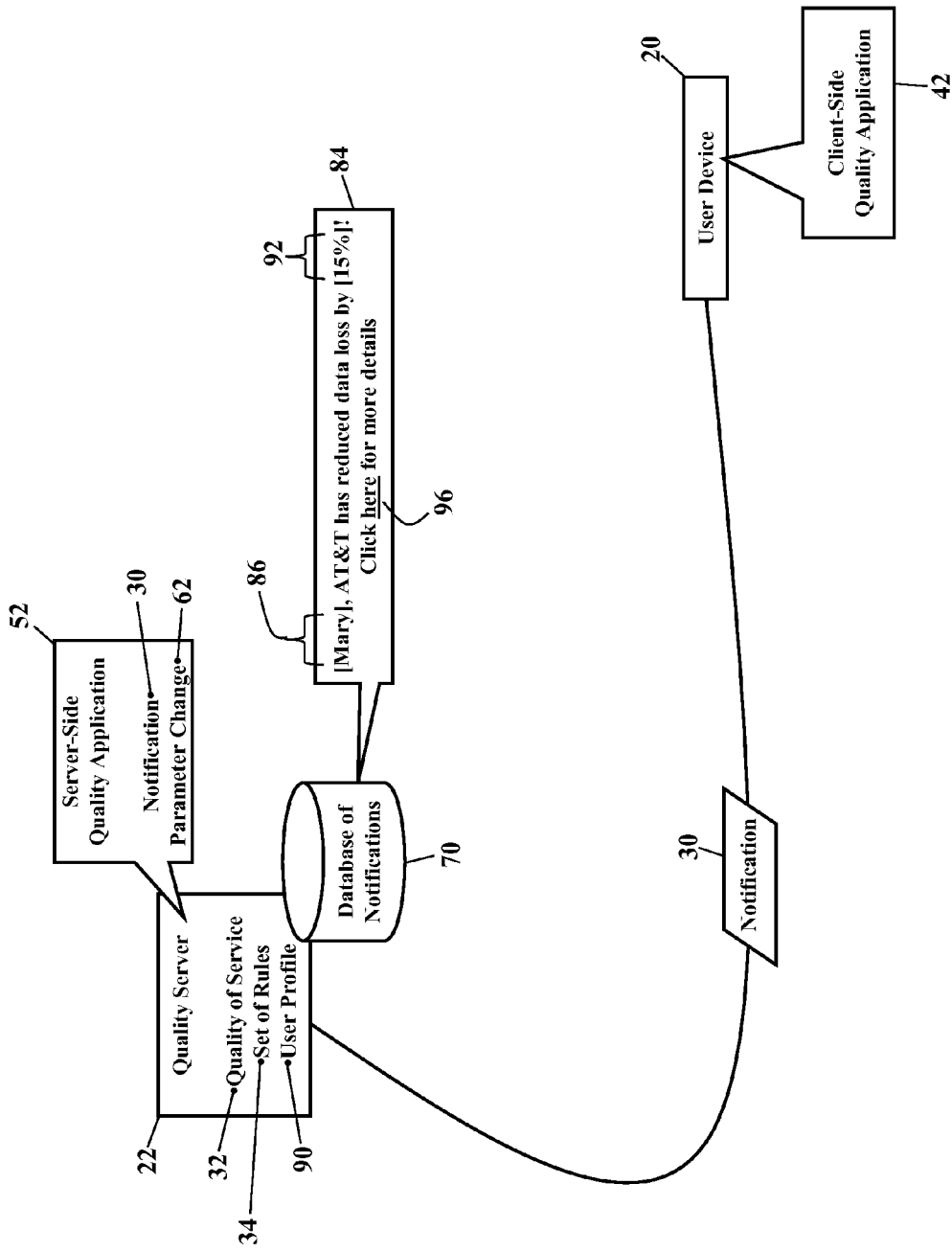
Figure 6:
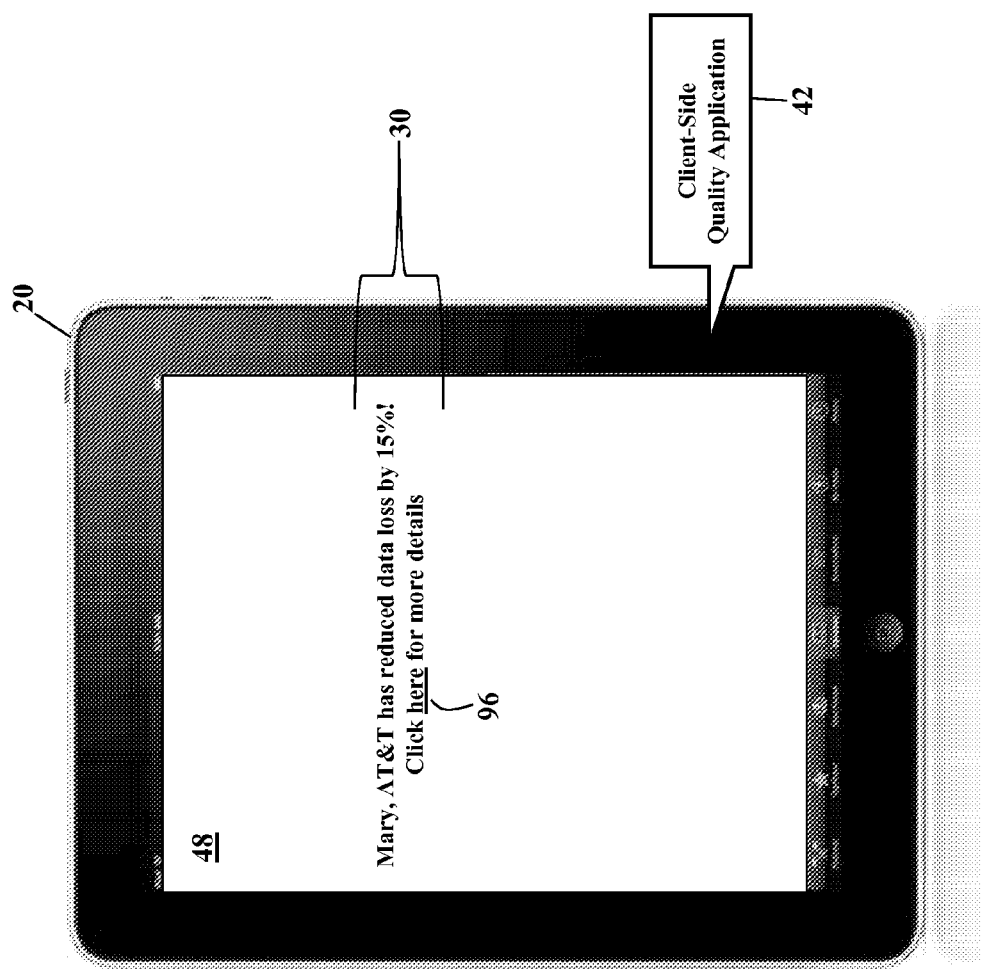

FIGS. 4-6 are schematics illustrating templates, according to exemplary embodiments. Here exemplary embodiments may build, or construct, the notification 30 using standardized messaging templates. Here the database 70 of notifications may associate different templates 84 to different configuration parameters 28, rules 82, and/or parameter changes 62. The server-side quality application 52 again queries the database 70 of notifications for the configuration parameter 28, rule 82, and/or parameter change 62 that satisfied the set 34 of rules. The server-side quality application 52 retrieves the associated template 84.

As FIGS. 5-6 illustrate, the message template 84 may be personalized. The template 84 may have one or more fields 86 that are populated with personalized text or other data. The server-side quality application 52, for example, may query a user profile 90 for a name, address, or other personalizing data. Any personalized data may be inserted into the message template 84. The set 34 of rules may also require specific text, such as a numerical improvement 92 in the quality 32 of service caused by the parameter change 62 in any individual configuration parameter 28 (e.g., "Mary, AT&T has reduced data loss by 15%!"). The server-side quality application 52 populates the template 84 and sends the template 84 as the notification 30 to the user device 20.

FIG. 6 illustrates the notification 30. Here the notification 30 is visually produced on the display device 48 of the user device 20. The user device 20 is illustrated as an APPLE® IPAD®, but the user device 20 may be any device. The notification 30 informs the user of changes in the communications network (illustrated as reference numeral 24 in FIGS. 1-2) that enhance the quality 32 of service. The notification 30 highlights or reinforces the user's perception and understanding of the service provider's actions and efforts. Moreover, the notification 30 may include a website link 96 for more details regarding the enhancement in the quality 32 of service. While FIG. 6 illustrates the notification 30 prominently displayed, the user may prefer a less intrusive presentation. The notification 30, for example, may be displayed as a banner in a lower region of the display device 48. The user may configure the client-side quality application 42 to specify the location for the notification 30.

FIG. 7 is a schematic illustrating custom notifications, according to exemplary embodiments. Here the notification 30 may be at least partially customized by the user at the user device 20. The user may configure the user profile 90 to specify when and/or how the notifications 30 are sent to the user device 20. Some users, for example, may not want to receive the notification 30, so the user may opt-out in their user profile 90. Other users may only want to be notified of significant improvements in quality of service, and perhaps for only certain measures of quality. Bandwidth connection speed, for example is a commonly-used measure of service. Some users may only want to be informed of the parameter change 62 in any individual configuration parameter 28 that results in at least a 10% threshold increase in bandwidth bits per second. Some users may decline to be notified of reductions in jitter, packet loss, or other less common measures of quality of service. Some users may prefer the service provider make one or more of these various choices for them, such that this sort of customer preference option may also be provided.

FIG. 7, then, illustrates the graphical user interface 46. Here the user may select options and features for customizing the notification 30. First, the user may opt-in, or op-out, of all notifications. If the user wishes to be notified of enhancements to quality of service, the user may select the configuration parameters 28 for which the notification 30 is desired. While FIG. 7 only illustrates common configuration parameters 28, the user may select a feature 100 that displays a fuller, even complete, listing of the configuration parameters 28. The user may additionally or alternatively enter threshold values 102 for any of the configuration parameters 28. If any threshold value 102 is equaled or exceeded, then the notification 30 may be sent.

The user may prefer Mean Opinion Scores. Many users may find the configuration parameters 28 are too complicated to individually specify. Moreover, for many reasons, there may be no correlation between the configuration parameters 28 and the customer's quality of service and experience. Exemplary embodiments may thus use Mean Opinion Scores 104. The Mean Opinion Scores 104 are numerical indications of perceived quality of service. The Mean Opinion Scores 104 may be results of subjective tests. The user may thus configure the user profile 90 to use the Mean Opinion Scores 104 to evaluate quality of service and experience. Mean Opinion Scores 104 may be objectively determined for video, audio, and/or audio-video. Others Mean Opinion Scores may also be developed, such as objective measurements of transaction delays, voice quality, and other measurements. The Mean Opinion Scores 104, however, are only examples. Any measures or parameters could be used and presented and/or manipulated. Moreover, the Mean Opinion Scores 104, or any other measures or parameters, need not be numerical determinations. Quality may be expressed as letter grades (e.g., A, B, or C), ratings values (stars, thumbs-up/down), colors (e.g., green, yellow, red), sizes (e.g., large, medium, small), or any other objective or subjective measures of quality.

The notification 30 and/or the rule 82 may also be customized according to software or service platforms. Some users may only want notifications of quality improvements for video services. Some users may not care about quality improvements in messaging services or sharing applications. The user may thus configure the user profile 90 to specify which software applications and/or services 106 are eligible for the notifications 30 and/or the rule 82.

The notification 30 may also be intelligently learned from user behavior. As the client-side quality application 42 and the server-side quality application 52 cooperate, inferences may be made from their data exchanges, requests, and other interactions. These inferences may be used to automatically configure the user profile 90 to accept, or to decline, the notifications 30 for specific software applications and/or services 104. The notifications 30 may further be inferred from user inputs and accepted in real time, or near real-time, and used instantaneously.

Figure 8:
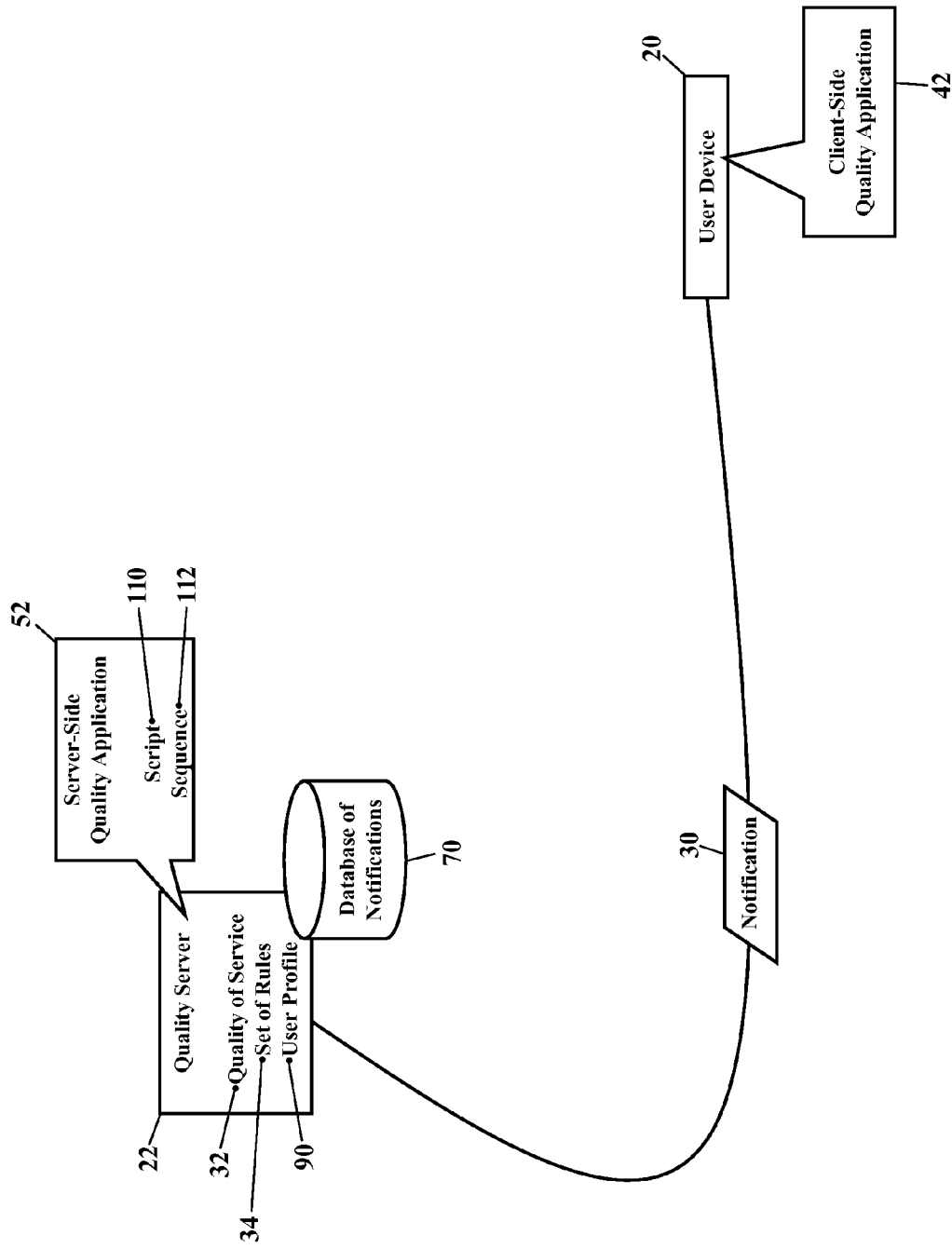
FIG. 8 is a schematic illustrating scripted notifications, according to exemplary embodiments.

FIG. 8 is a schematic illustrating scripted notifications, according to exemplary embodiments. Here the notification 30 may be inserted into a script 110. The script 110 may be an orchestrated sequence 112 that specifies when the notification 30 is sent to the user at the user device 20. The script 110 may even specify when the notification 30 is displayed by the user device 20. The notification 30 may be timed for presentation to coincide with implementation of any service, launching of any software application, and/or completion of any activity. The notification 30 may even be audible or verbal and presented during a call or other appropriate event. The notification 30 may thus part of an orchestrated series of software steps that specifies when the user device 20 is notified. The script 110 may even include its own rules for various purposes.

Multiple notifications 30 may also be sequenced. Sometimes enhancements to quality of service may require multiple notifications 30 to the user device 20. Exemplary embodiments may thus determine when to provide multiple notifications 30, and in what sequence 112 or in what script 110 the multiple notifications 30 are provided. One or more notifications 30 may be simple (e.g., a single pop-up notification sent unconditionally), highly complex (e.g., a set of multiple notifications of multiple types sent at multiple times, conditional on precise user activity), or even an in-between, moderately simple/complex situation. Different notifications 30 may have a configured set of timings, and the set 34 of rules may specify the appropriate timing or script. In general, though, the notification 30 is preferably timed for presentation when quality improvements are most noticeable to the user at the user device 20, thus again purposefully forming positive mental associations in the user's mind.

Figure 9:
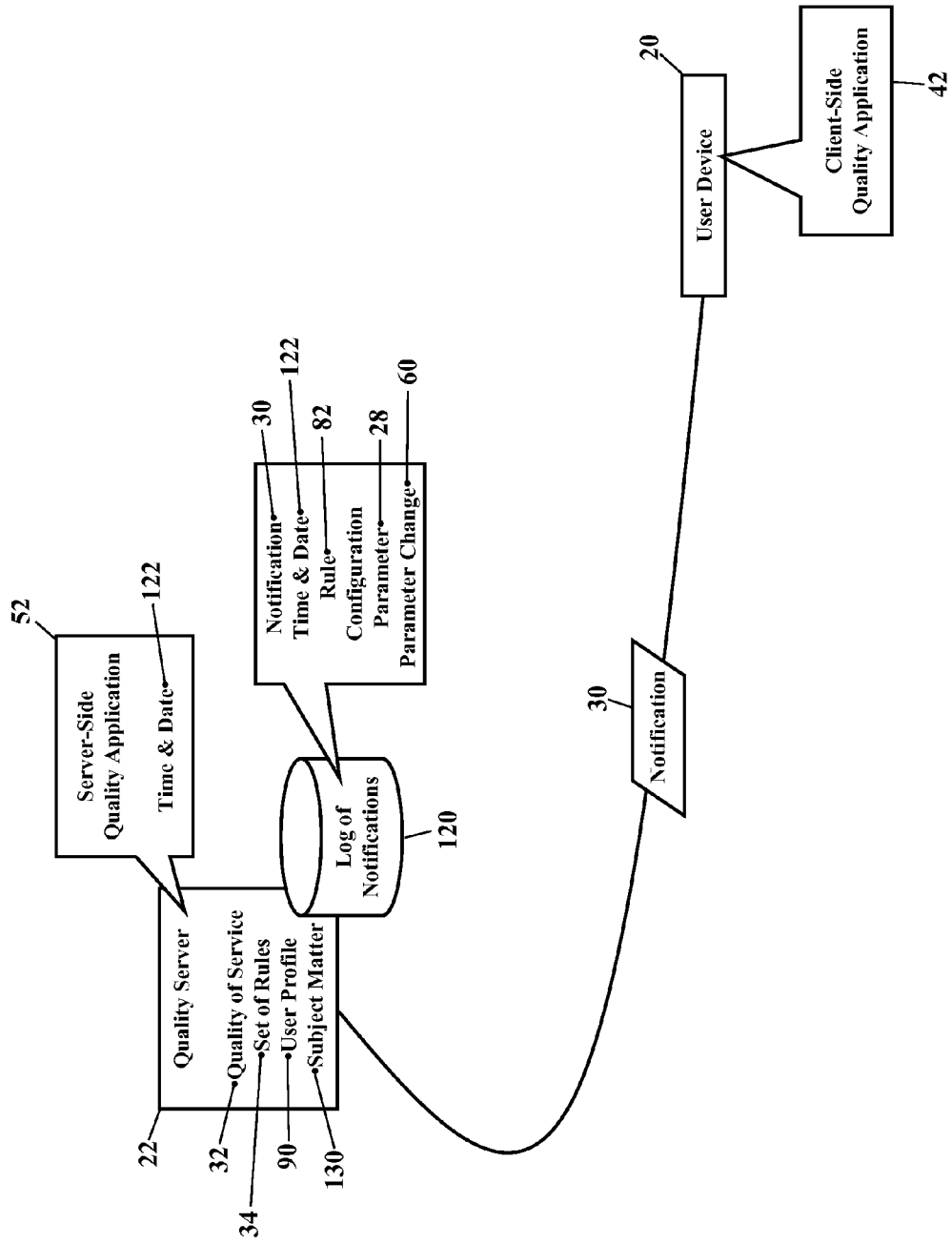
FIG. 9 is a schematic illustrating a log of notifications, according to exemplary embodiments.

FIG. 9 is a schematic illustrating a log 120 of notifications, according to exemplary embodiments. Here the client-side quality application 42 and/or the server-side quality application 52 may log each notification 30 that is sent to the user device 20. When the notification 30 is sent, a time and date 122 of the notification 30 is added to the log 120 of notifications. The log 120 of notifications may be a relational table locally stored in the quality server 22 or any other location in the communications network 24. The log 120 of notifications may map each notification 30 to the rule 82 that required or triggered the notification 30, the configuration parameter(s) 28 that caused the notification 30, and/or the parameter change 62 in the configuration parameter 28. The log 120 of notifications may also be associated with the user device 20 and/or the user profile 90. The log 120 of notifications thus tracks and maintains an historical record of the notifications sent to each user (e.g., each Internet Protocol address).

The log 120 of notifications helps prevent conflicting notifications. Because each notification 30 is logged, exemplary embodiments may prevent duplicate, or conflicting, notifications 30. The log 120 of notifications may be queried to determine and to test potential correlations that might cause the user to doubt the veracity or relevancy of past notifications. The log 120 of notifications helps ensure that subsequent failures or problems will not convince the user that the service provider has misrepresented quality improvements (i.e., "they said they improved my connection, but right after that it got worse"). Exemplary embodiments may thus query the log 120 of notifications to find changes or events that may cause the user to doubt the veracity or relevancy of previous notifications. Correlations may be formed and tested to ensure that notifications do not conflict. When appropriate, e.g., when particular correlations exceed a significance threshold, further notifications or explanatory messages may be sent (e.g., "You may have noticed a degradation just now, and we wanted to assure you its timing was coincidental and unrelated to a previous notification explaining an improvement to your service").

Exemplary embodiments may thus query the log 120 of notifications. Before each notification 30 is sent, the log 120 of notifications may be queried to determine if the same, or similar, notification 30 has already been sent. The client-side quality application 42 and/or the server-side quality application 52 may query the log 120 of notifications for the rule 82, configuration parameter 28, and/or the parameter change 62 that triggered the notification 30. If the notification 30 potentially conflicts with a previously-sent notification, then exemplary embodiments may decline to send the notification 30.

The user profile 90 may also limit the notifications 30. As the paragraphs accompanying FIG. 7 explained, some users may not want to receive the notification 30. Some users may only wish to receive notifications associated with a particular service or application 104. The user profile 90, however, may be defined as the user wishes. The user profile 90, for example, may specify any subject matter 130 for which the notification 30 is desired. Moreover, some users may only wish to receive five (5) notifications per month; afterwards, no further notifications are to be sent. Exemplary embodiments, then, may consult the user profile 90 for any rules, restrictions, or preferences related to the notifications 30. If the user profile 90 prohibits the notification 30, then exemplary embodiments may decline to send the notification 30. If the user profile 90 permits the notification 30, then exemplary embodiments may send the notification 30.

Figure 10:
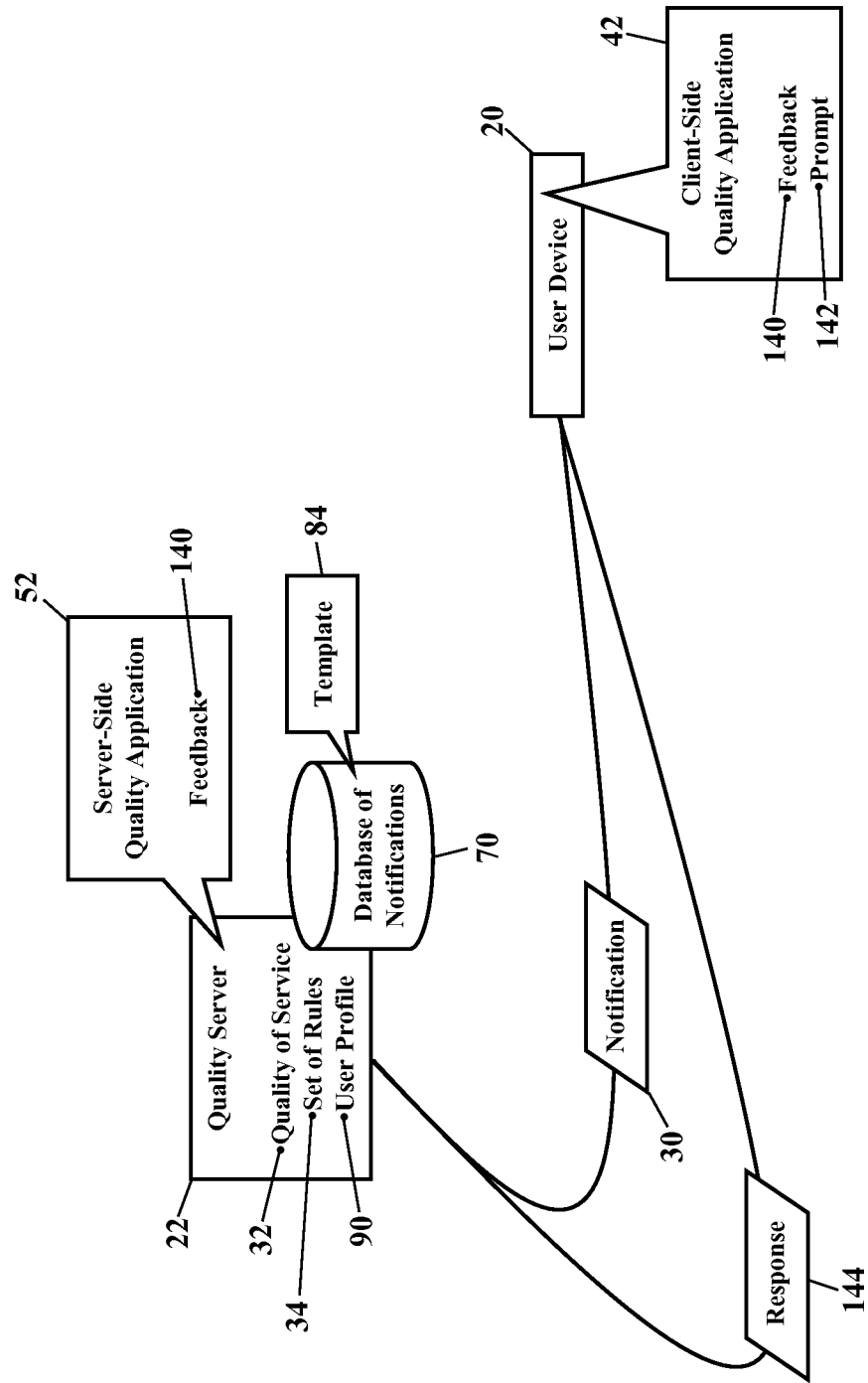
FIG. 10 is a schematic illustrating feedback, according to exemplary embodiments.

FIG. 10 is a schematic illustrating feedback, according to exemplary embodiments. Here the client-side quality application 42 and/or the server-side quality application 52 may seek feedback 140 concerning improvements to quality of service. After the notification 30 is sent to the user device 20, the notification 30 may further prompt the user for the feedback 140. The client-side quality application 42 may cause the user device 20 to visually display a prompt 142. A response 144 to the prompt 142 is then sent back to the quality server 22. The response 144 may then be used to further refine quality of service.

The feedback 140 may be judiciously solicited. Some users, some features, or some services may benefit from a follow-up mechanism. The feedback 140, though, should not burden or inconvenience the user or the user's experience. The user profile 90, of course, may be consulted to determine whether the user wishes to provide the feedback 140, if solicited. Some user may prefer no follow-up ever, while others may want additional follow-up or information always, but the majority of customers would probably fall in-between but lean toward less follow-up. The feedback 140 may be decreased for similar repeat occurrences (e.g., more follow-up the first time, but less follow-up with future similar events). If the feedback 140 has not been solicited since a predetermined period of time, then additional feedback 140 may be advisable. The feedback 140 may be specific to, tailored to, adapted to, and/or influenced by the particular type of event, plus the conditions in effect at the time (including the user's activity and/or status, location, and presence). The feedback 140 may even conform to a template 84 from the database 70 of notifications and prompt the user to populate fields in the template 84. The templates 84 may be profile-specific, such that different templates are established for different types of users. The feedback 140 may cycle back to a previous software module or function, as needed, providing an appropriate input for refinement. For example, the user may wish to compare a previous event, and/or desire further information or specifics, or desire an explanation (e.g., access/pointer to a FAQ item), or statistical info (e.g., how many times has the service provider performed the beneficial action in the last month or year, or how significant is the action, or how correlated with a particular service/application).

Figure 11:
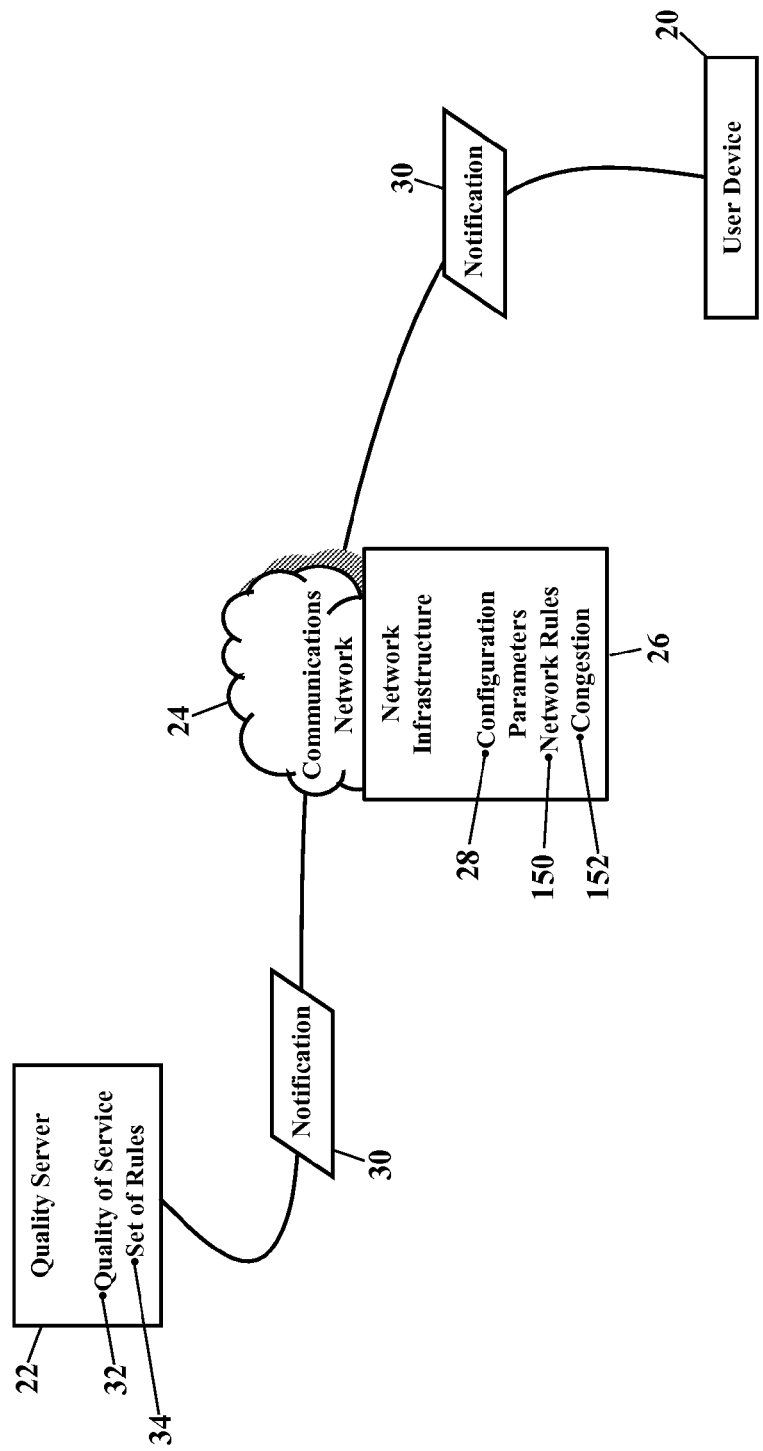
FIG. 11 is a schematic illustrating network rules, according to exemplary embodiments.

FIG. 11 is a schematic illustrating network rules 150, according to exemplary embodiments. Here exemplary embodiments may decline to send the notification 30 when the network rules 150 require. The network rules 150, for example, may prohibit the notification 30 when the communications network 24 is experiencing moments of congestion 152. The notification 30, especially when sent to groups of hundreds or thousands of users, may exacerbate the congestion 152 in the communications network 24. The network rules 150 logically express threshold conditions that, when satisfied, decline to impose further burdens on the communications network 24. The network infrastructure 26 may compare the network rules 150 to parameters describing network conditions in the communications network 24. If any network rule 150 is satisfied, the client-side quality application 42 and/or the server-side quality application 52 may be instructed to decline the notification 30, when network conditions require.

Figure 12:
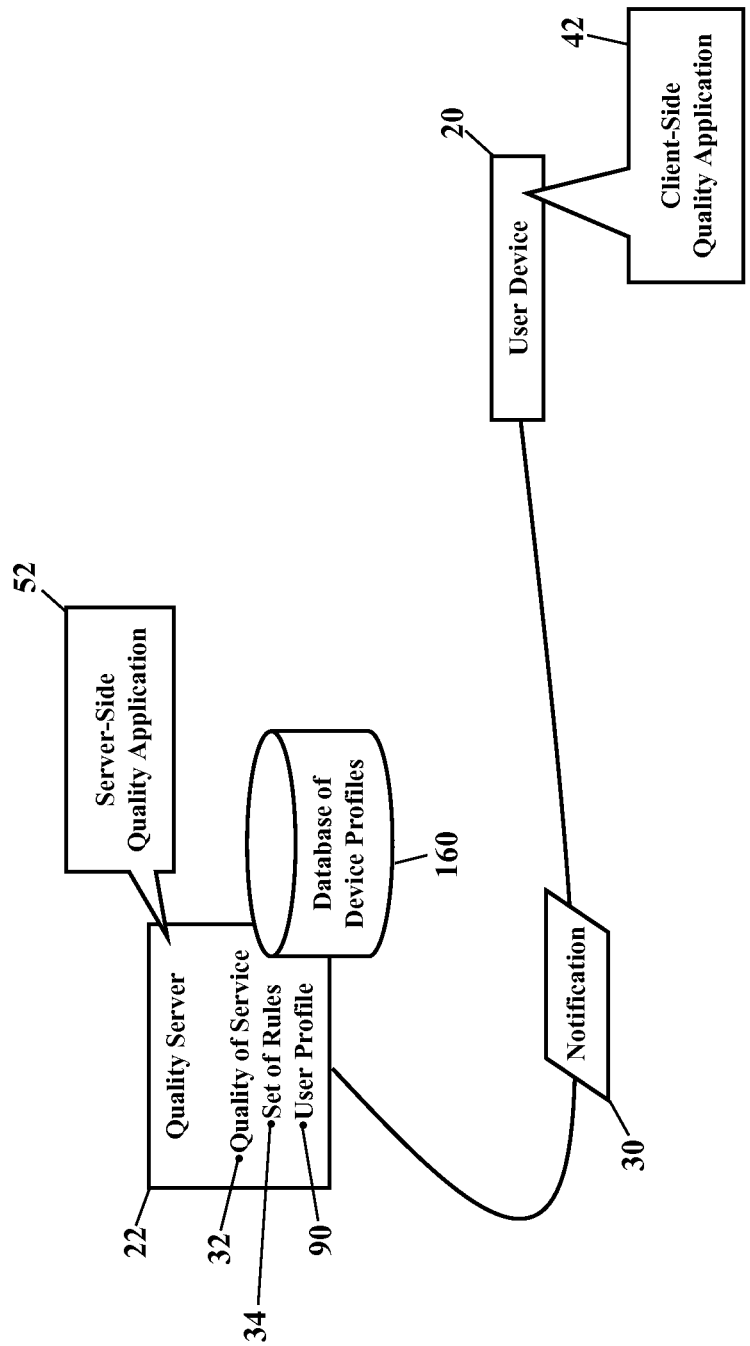
FIG. 12 is a schematic illustrating device profiles, according to exemplary embodiments.

FIG. 12 is a schematic illustrating device profiles, according to exemplary embodiments. Here exemplary embodiments may tailor the notification 30 to the capabilities and features of the user device 20. When the set 34 of rules requires the notification 30, the client-side quality application 42 and/or the server-side quality application 52 may query a database 160 of device profiles. The database 160 of device profiles is illustrated as being locally stored in the quality server 22, but the database 160 of device profiles may be remotely maintained and accessed from any location in the communications network 24. The database 160 of device profiles stores information describing the capabilities and features of the user device 20. The database 160 of device profiles may also store information describing software applications stored on, and/or executing by, the user device 20. When the notification 30 is desired, exemplary embodiments may query the database 160 of device profiles and configure the notification 30 to best suit the capabilities and features of the user device 20. The database 160 of device profiles may thus be used to tailor the notification 30 to the capabilities and features of the user device 20.

Device profiles may be advantageously used when sending the notification 30. The database 160 of device profiles helps determine when the notification 30 is sent and even the content or presentation of the notification 30. Because the database 160 of device profiles stores the capabilities, features, and/or software applications of the user device 20, the database 160 of device profiles may even track software and hardware upgrades. If the user configures a software application to decline a feature, exemplary embodiments may inform the user that quality improvements would be noticeable if this feature were implemented. For example, the notification 30 may inform the user that "AT&T recently conducted an upgrade to improve your service, which will have a noticeable effect if you enable [feature description]." The notification 30 may even provide instructions to enable the feature.

The device profile may also specify a memory location for the notifications 30. Even if the user does not want real time notifications 30, the notifications 30 may still be sent to the user device 20. The client-side quality application 42 and/or the server-side quality application 52 may create or specify a folder, for example, for storing all the notifications 30. Whenever the user wishes to see any notification 30, the user may consult the folder to retrieve any particular notification 30. The user may even consult the log 120 of notifications to help identify and retrieve any particular notification 30.

Several more examples are provided. Suppose a service provider changes one or more configuration parameters 28 that will noticeably improve Internet telephony calls. If the user device 20, though, lacks the capability to make Internet telephony calls, then the notification 30 may be unnecessary. If the database 160 of device profiles indicates that the user device 20 does not store a software application for Internet telephony calls, then the notification 30 may be meaningless to the user. Similarly, if changes in the communications network 24 will improve the resolution of movies and other videos, the notification 30 may be pointless when the user device 20 has a small display screen. If the notification 30 includes ADOBE® FLASH® animation, but the user device 20 lacks an ADOBE® FLASH® software application, then the notification 30 may produce an error at the user device 20. Exemplary embodiments, then, may query the database 160 of device profiles to ensure the notification 30 conforms to the capabilities and features of the user device 20.

Figure 13:
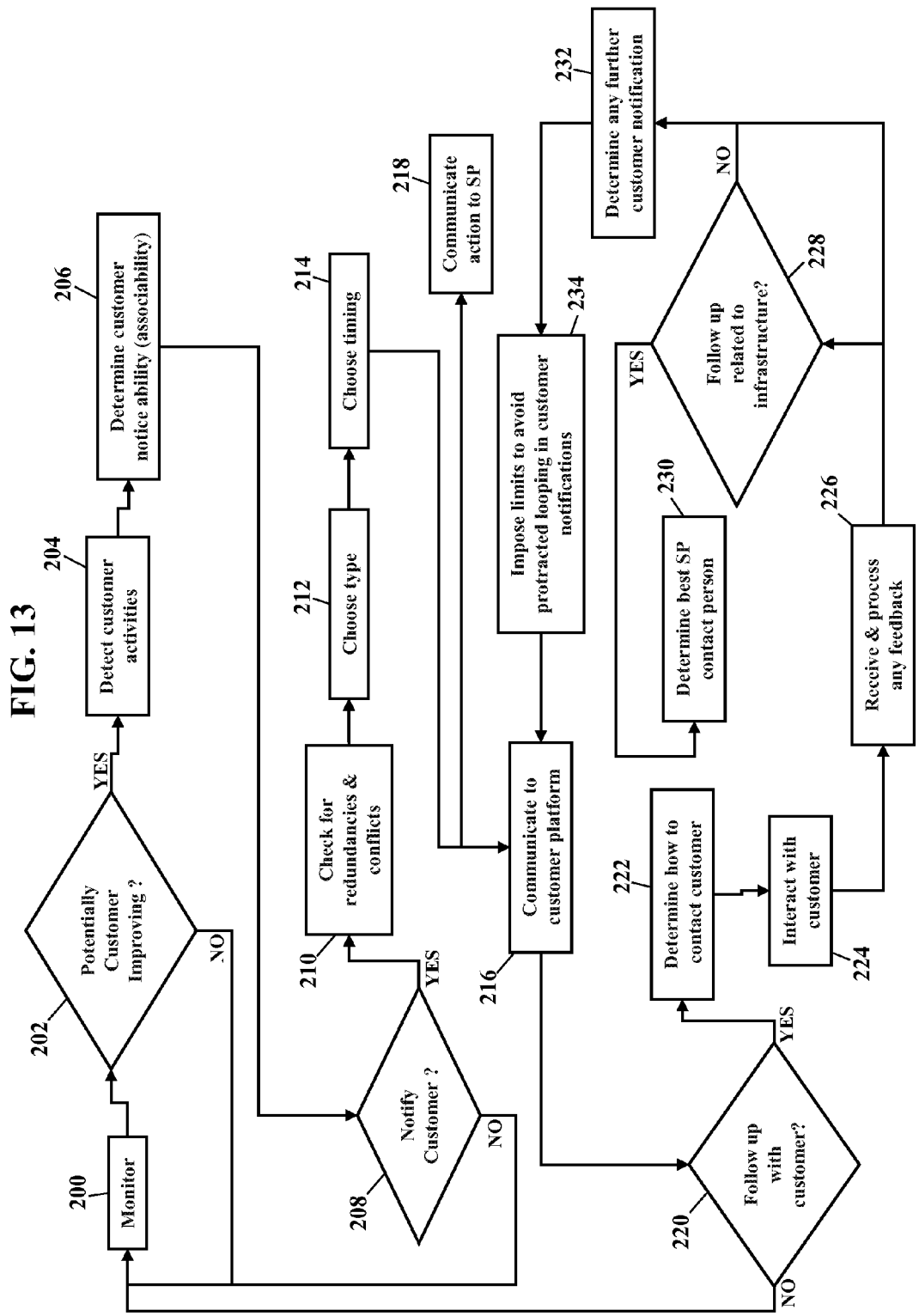
FIG. 13 is a flowchart illustrating a method of enhancing quality of service, according to exemplary embodiments.

FIG. 13 is a flowchart illustrating a method of enhancing quality of service, according to exemplary embodiments. The network infrastructure 26 is monitored for events that enhance quality of service in the communications network 24 (Block 200). This logical block detects or identifies particular service provider actions or efforts that benefit the user's experience. Exemplary embodiments may also detect actions or events that may also be inferred or interpreted as benefitting the user's experience. This monitoring process may be either a manual or an automated process which supports two-way communication. Various software and hardware sensors, for example, may monitor the network infrastructure 26 to detect relevant events and actions. Even user interactions with the communications network 24 may be monitored to detect relevant events and actions.

The method determines if the detected event or action noticeably improves quality of service (Block 202). As previous paragraphs explained, not all events or actions result in a noticeable, perceivable change in quality of service. The set 34 of rules, for example, may logically define the parameter change 62, thresholds, or ranges that produce noticeable enhancements to quality of service. Those events and service provider actions that promote positive mental associations are targeted for reporting.

User activities may also be detected (Block 204). The user's interactions with the user device 20 may be monitored and reported to the quality server 22. The exchanges between the user device 20 and the quality server 22 may also be monitored and maintained by the quality server 22. Noticeable enhancements may depend on the software application in use, what the user is currently doing, previous actions of the user, the user's normal or predictive actions, preferences, the user profile 90, and/or the device profile in the database 160 of device profiles.

The user's activities may be associated with the service provider's actions or efforts (Block 206). Exemplary embodiments provide the user with an awareness that the service provider has improved the user's experience, preferably at the time that the improvement has occurred or has been accomplished. The noticeable events may be correlated to the user's interactions at a particular time or within a particular time period. This association or correlation determines that a mental connection is feasible. This association function may use a set of matching templates (match indicates likely mental connection possible).

A decision is made to notify the user (Block 208). As earlier paragraphs explained, the user is usually only informed of noticeable enhancements to quality of service. The set 34 of rules may be defined to quantify perceptible ranges of changes to the configuration parameters 28 in the network infrastructure 26 of the communications network. When a rule in the set 34 of rules is satisfied, then the user may be notified.

Before the notification 30 is sent, redundancies or conflicts are checked (Block 210). Duplicate, or conflicting, notifications 30 may cause the user to doubt the veracity or relevancy of past notifications. The log 120 of notifications, for example, may be queried to determine if the same, or similar, notification 30 has already been sent. The user profile 90 may also be queried for limits, or maximum numbers, on the number of the notifications 30 in any period of time. The user profile 90 may also be queried for any rules, restrictions, or preferences related to the notifications 30.

When notification is desired, a type of the notification 30 is chosen (Block 212). There may be different notifications for different situations, configuration parameters 28, users, user devices, and any other criterion. The user's clicks, actions, or selections may determine which notification is sent. The notification 30 may be based, wholly or partially, on the user profile 90 describing the user's preferences and/or configuration settings. The notification 30 may be based, wholly or partially, on the capabilities and/or features of the user device 20, as earlier paragraphs explained. The notification 30, in short, may be selected to best suit the enhancement to quality of service, the user, or the user device 20. Even multiple notifications may be sent, with each notification emphasizing a different aspect of quality of service. Multiple notifications may also be sent to multiple user devices all associated with the same user. Each notification may thus be configured and customized for different user devices, thus ensuring the user is appropriately notified of enhancements to quality of service according to device.

The timing of the notification 30 may also be chosen (Block 214). When one or more type(s) of notification(s) are desired, the notification 30 may be inserted into the script 110 and/or the sequence 112, as earlier explained. The timing of the notification 30 is preferably chosen to reinforce mental associations in the user's mind that binds the service provider's efforts to perceivable improvements in service.

The notification 30 is sent (Block 216). When enhancements to quality of service are perceivable to the user (as determined by the set 34 of rules), the quality server 22 sends the notification 30 to an address (e.g., Internet Protocol address and/or telephone number) associated with the user device 20. The notification 30 informs the user of an improvement in quality 32 of service provided to the user device 20. The notification 30 may also be communicated to the service provider for logging and for management review (Block 218).

The feedback 140 may be solicited (Block 220). Sometimes feedback may be input to any software module or process to further improve quality of service. Exemplary embodiments, then, may determine whether the feedback 140 is solicited. If the feedback 140 is desired (Block 220), a determination may be made how best to interact with the user device 20 (Block 222). The user profile 90, for example, may be consulted to determine the user's preferences for providing the feedback 140, if solicited. The user device 20 is contacted (Block 224) and the feedback 140 is received (Block 226). The feedback 140 is input into the network infrastructure 26 (Block 228). If human interaction is required, the feedback 140 may be routed or assigned to an appropriate person, group, or team (Block 230). If the feedback 140 requires additional notifications 30 (Block 232), notification limits may be imposed to avoid burdening the user (Block 234).

Figure 14:
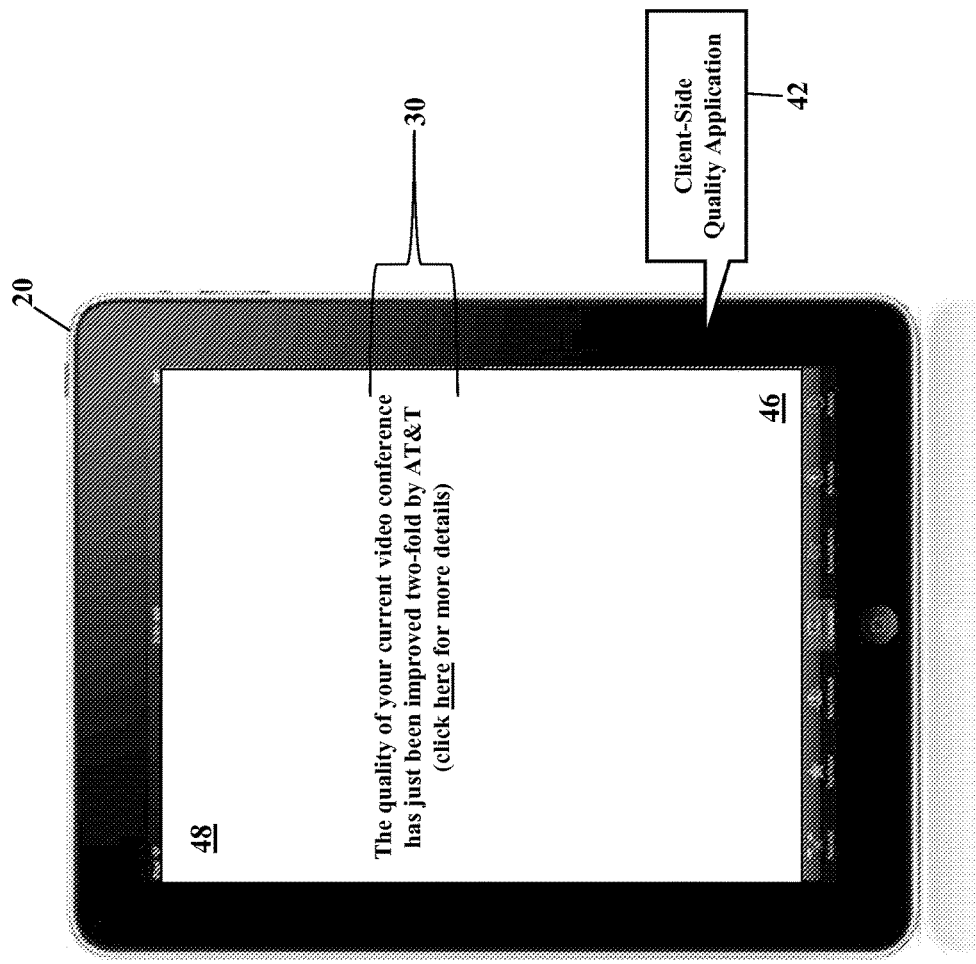
FIG. 14 is a schematic illustrating a notification, according to exemplary embodiments.

FIG. 14 is a schematic illustrating the notification 30, according to exemplary embodiments. When the notification 30 is desired, the client-side quality application 42 causes the user device 20 to produce the graphical user interface 46 on the display device 48. FIG. 14 illustrates the notification 30 as a text message overlaid onto, or incorporated into, the graphical user interface 46. The notification 30 alerts the user to perceivable or noticeable improvements in the quality of service provided to the user device 20. The notification 30 preferably coincides with the user's experience, so that the notification 30 is closely associated with what the user is actually doing at the time or within a reasonable previous window of time. When the user device 20 makes some request for a communications service, the notification 30 allows the user to immediately see, and better recognize, the value of the communications services provide by the service provider. The user may thus immediately perceive any enhancements to their quality of service and experience. The notification 30 thus helps the service provider justify charges network improvements, and the notification 30 increases customer loyalty. The notification 30 reinforces the mental perception that the service provider is constantly striving to improve service.

Figure 15:
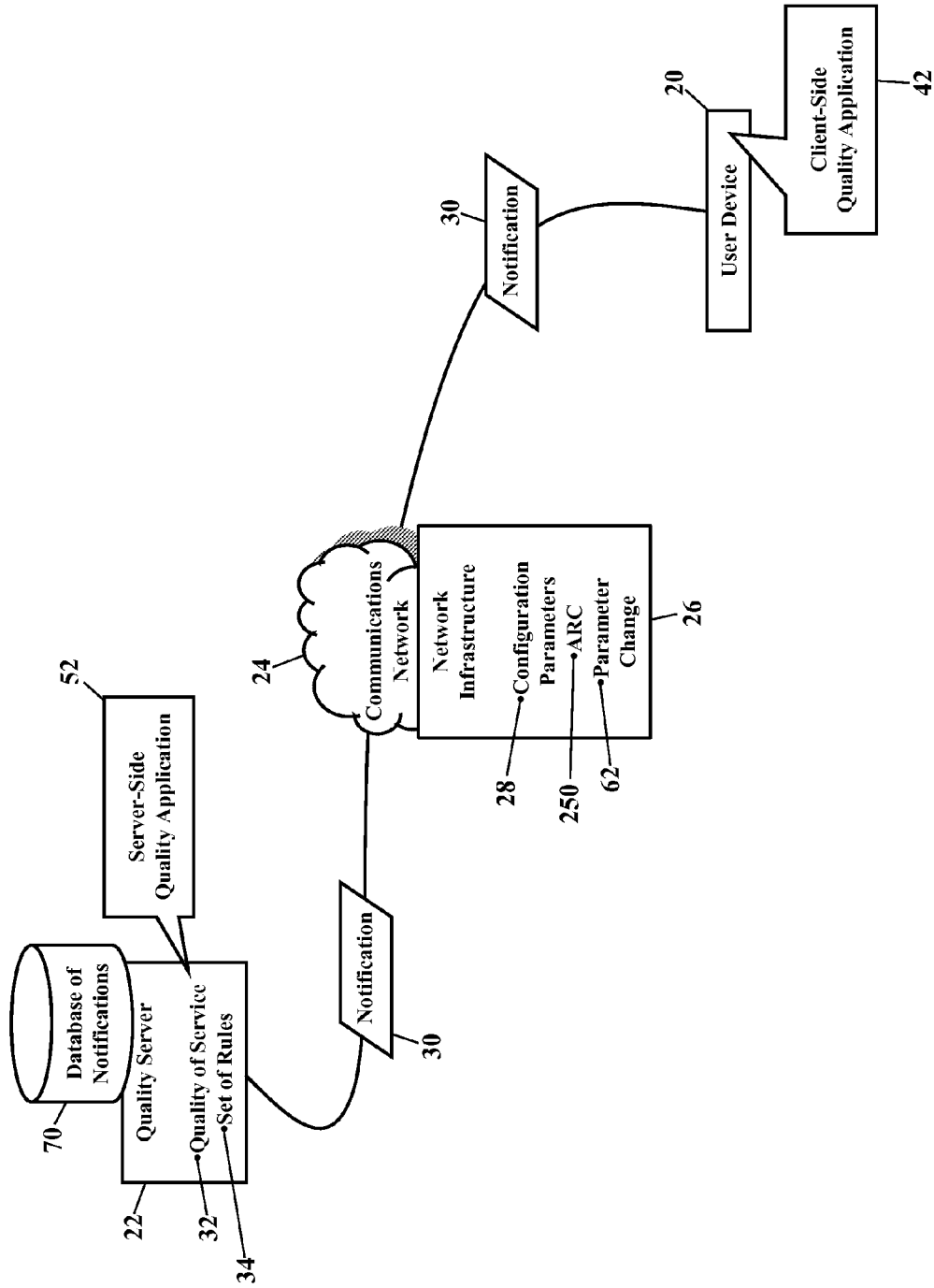
FIG. 15 is a schematic illustrating admission and resource control parameters, according to exemplary embodiments.

FIG. 15 is a schematic illustrating admission and resource control parameters, according to exemplary embodiments. Here exemplary embodiments may monitor Admission and Resource Control (ARC) 250 to notify of enhancements to quality of service. As those of ordinary skill in the art understand, the Admission and Resource Control 250 provides a set of capabilities that can be used to notify the user device 20 of the service provider's investment and how that investment changes the user's experience. Dynamic actions are more visible to the end user, for the service provider's actions and upgrades are not visible to the user unless put into usage in a dynamic fashion to enhance the user experience. The Admission and Resource Control 250 may thus be exploited across the wired and wireless networks to reveal the service provider's investment in service enhancements.

The Admission and Resource Control 250 may thus be advantageously used. The Admission and Resource Control 250 may interact with wired and wireless networks at the same time. However, the Admission and Resource Control 250 provides these enhancements by design by providing the enhancements to admission control, end-user/endpoint configuration, dynamic resource allocation, forwarding topology, and locating endpoints.

The Admission and Resource Control 250 may thus be used to notify of enhancements to quality of service. When the user device 20 sends any request for any communications service, exemplary embodiments may monitor the Admission and Resource Control 250. As the network infrastructure 26 configures the requested communications service, the Admission and Resource Control 250 sends any parameter change 62 to the server-side quality application 52 and/or to the client-side quality application 42. The parameter change 62 is compared to one or more rules in the set 34 of rules. If a rule is satisfied, the database 70 of notifications may be queried for the notification 30 associated with a parameter in the Admission and Resource Control 250. The notification 30 is retrieved and sent to the user device 20. The user device is thus informed of the parameter change 62 to the admission and resource control parameter.

The service provider may emphasize any action. The service provider may emphasize network-related actions (e.g., QoS-related) or any action having some degree of control. The following are some examples:
Accessibility (Session setup time),
Speed (capacity/throughput),
Reliability (application session success rate, stability, function),
Response (RTT, Display rendering),
Portability (interoperability on different devices), and/or
Extension (Providing APIs for capability of devices to extend besides the obvious use).

Figure 16:
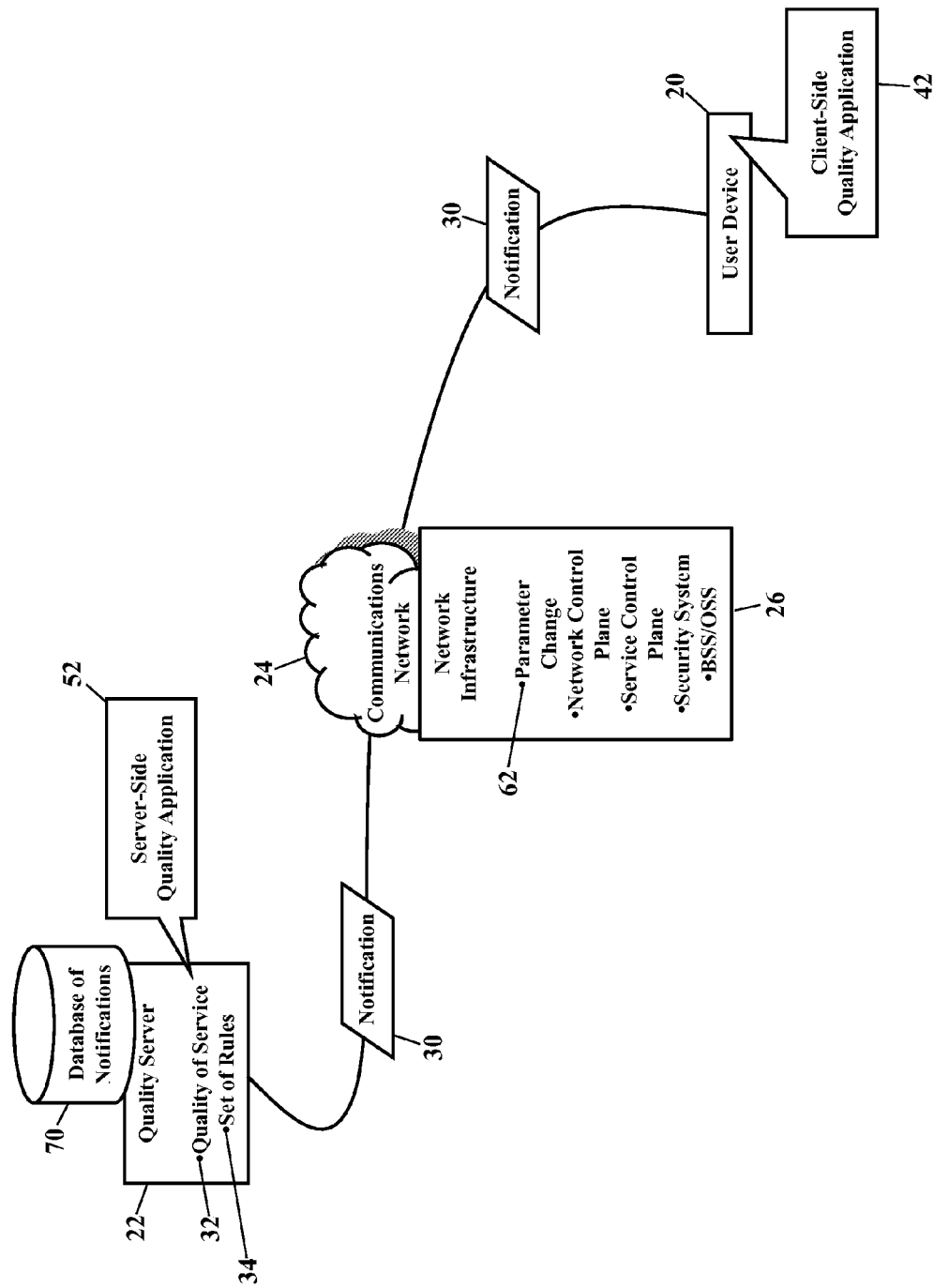
FIG. 16 is a schematic illustrating additional parameters, according to exemplary embodiments.

FIG. 16 is a schematic illustrating additional parameters, according to exemplary embodiments. FIG. 16 illustrates that the network infrastructure 26 may inform the server-side quality application 52 and/or the client-side quality application 42 of any parameter change 62 in any system or service. The network infrastructure 26, for example, may monitor a network control plane and/or messages, a service control plane and/or messages, security systems, and/or BSS/OSS (Business Support Systems and/or Operations Support Systems). Whatever the parameter change 62, the parameter change 62 is compared to one or more rules in the set 34 of rules. If a rule is satisfied, the database 70 of notifications may be queried for the notification 30 associated with a parameter in the Admission and Resource Control 250. The notification 30 is retrieved and sent to the user device 20. The user device is thus informed of the parameter change 62 to the admission and resource control parameter.

Figure 17:
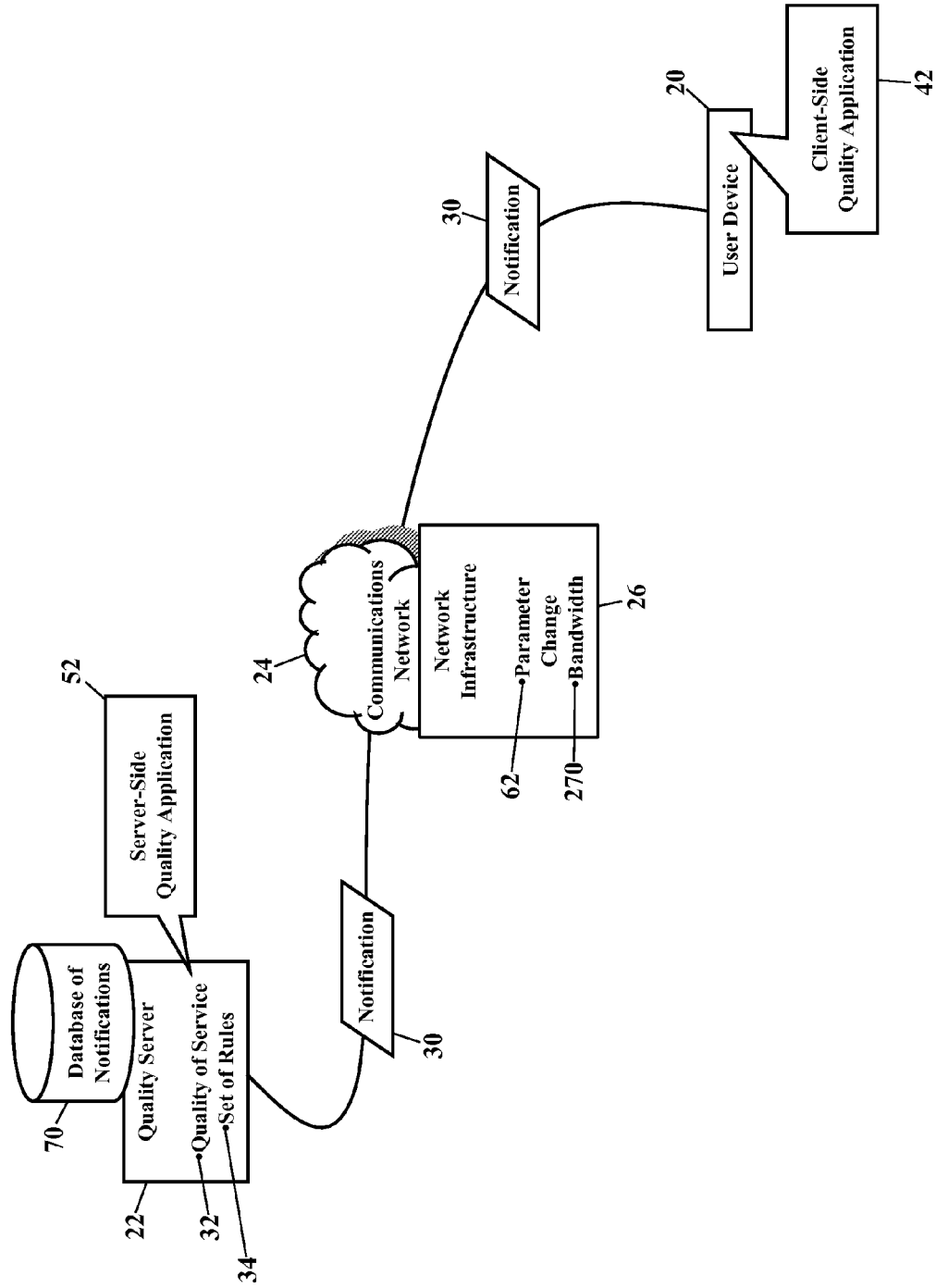
FIG. 17 is a schematic illustrating enhancements to bandwidth, according to exemplary embodiments.

FIG. 17 is a schematic illustrating enhancements to bandwidth, according to exemplary embodiments. While exemplary embodiments may notify of anything that enhances quality of service, most residential and business users are familiar with bandwidth 270. Upload and/or download connection speeds (e.g., bandwidth in bits per second) may be the broadest and simplest indicator of quality of service. Sophisticated users may understand other configuration parameters 28, such as packet loss, jitter, and latency, but the bandwidth 270 is understood by most users.

FIG. 17, then, notifies users of enhancements to the bandwidth 270 serving the user device 20. Any parameter change 62 may be compared to the set 34 of rules. If a rule is satisfied, the database 70 of notifications may be queried for the notification 30. Here, though, the set 34 of rules may be defined to emphasize enhancements to the bandwidth 270 serving the user device 20. If the parameter change 62 results in an increase in the bandwidth 270, then the notification 30 is retrieved and sent to the user device 20. The user device 20 is thus informed of increases in bandwidth 270 caused by the parameter change 62.

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the IEEE 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer program product comprises processor-executable instructions for notifying of enhancements to quality of service and experience in the communications network 24, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving, at a server, an electronic notification describing a change to a network configuration parameter, the network configuration parameter associated with a network service provided on behalf of a user device, the user device associated with a network address in a communications network;
comparing, by the server, the change to the network configuration parameter to a range of values to determine a human perceptibility of the change to the network configuration parameter;
querying, by the server, an electronic database for the network configuration parameter in response to the human perceptibility of the change, the electronic database having a table that maps templates to network configuration parameters including the network configuration parameter described by the electronic notification;
identifying, by the server, a template of the templates in the electronic database that is mapped by the table to the network configuration parameter described in the electronic notification;
populating, by the server, the template with the change to the network configuration parameter to describe the human perceptibility of the change to the network configuration parameter;
retrieving, by the server, a notification that corresponds to the network configuration parameter;
inserting, by the server, the template populated with the change to the network configuration parameter into a sequence that times a presentation of the notification to correspond with the network service provided on behalf of the user device; and
sending, from the server, the template inserted into the sequence to the network address associated with the user device, the template notifying the user device of the human perceptibility of the change to the network configuration parameter.

2. The method of claim 1, further comprising retrieving the template.

3. The method of claim 1, further comprising populating the template with a congestion in the communications network as the network configuration parameter.

4. The method of claim 1, further comprising populating the template with a wireless signal strength as the network configuration parameter.

5. The method of claim 1, further comprising populating the template with a wireless interference as the network configuration parameter.

6. The method of claim 1, further comprising retrieving the template that is electronically associated with cellular communications.

7. The method of claim 1, further comprising retrieving the template that is electronically associated with a cellular communications tower.

8. A system, comprising:
a hardware processor; and
a memory device, the memory device storing code, the code when executed causing the hardware processor to perform operations, the operations comprising:
receiving an electronic notification describing a change to a network configuration parameter, the network configuration parameter associated with a communications service provided on behalf of a user device, the user device associated with a network address in a communications network providing the communications service;
determining that the change to the network configuration parameter satisfies a range of values defining a human perceptibility of the change to the network configuration parameter;
querying an electronic database for the network configuration parameter in response to the human perceptibility of the change, the electronic database having a table that maps electronic templates to network configuration parameters including the network configuration parameter described by the electronic notification;
retrieving an electronic template of the electronic templates mapped by the table to the network configuration parameter described in the electronic notification;
populating the electronic template with the change to the network configuration parameter to describe the human perceptibility of the change to the network configuration parameter;
retrieving a timed sequence that provides a notification of the change to the network configuration parameter;
inserting the electronic template populated with the change to the network configuration parameter into the timed sequence that provides the notification of the change to the network configuration parameter; and
sending the electronic template inserted into the timed sequence via the communications network to the network address associated with the user device to correspond with the network service provided on behalf of the user device, the electronic template notifying the user device of the human perceptibility of the change to the network configuration parameter.

9. The system of claim 8, wherein the operations further comprise populating the electronic template with an increased bandwidth as the network configuration parameter.

10. The system of claim 8, wherein the operations further comprise determining the change in a congestion in the communications network satisfies the range of values defining the human perceptibility.

11. The system of claim 8, wherein the operations further comprise determining the change in a wireless signal strength satisfies the range of values defining the human perceptibility.

12. The system of claim 8, wherein the operations further comprise determining the change in a wireless interference satisfies the range of values defining the human perceptibility.

13. The system of claim 8, wherein the operations further comprise retrieving the electronic template that is electronically associated with cellular communications.

14. The system of claim 8, wherein the operations further comprise retrieving the electronic template that is electronically associated with a cellular communications tower.

15. A memory device storing instructions that when executed cause a hardware processor to perform operations, the operations comprising:
receiving an electronic notification describing a change to a network configuration parameter, the network configuration parameter associated with a communications service provided via a communications network on behalf of a user device associated with a network address;
determining that the change to the network configuration parameter satisfies a range of values defining a human perceptibility of the change to the network configuration parameter;
querying an electronic database for the network configuration parameter in response to the human perceptibility of the change, the electronic database having a table that maps electronic templates to network configuration parameters including the network configuration parameter described by the electronic notification;
identifying an electronic template of the electronic templates in the electronic database that is mapped by the table to the network configuration parameter described in the electronic notification;
populating the electronic template identified in the electronic database with the with the change to the network configuration parameter described in the electronic notification;
retrieving a timed sequence that provides a notification of the change to the network configuration parameter;
inserting the electronic template populated with the change to the network configuration parameter in the timed sequence that provides the notification of the human perceptibility of the change to the network configuration parameter; and
sending the electronic template inserted into the timed sequence via the communications network to the network address associated with the user device to correspond with the network service provided on behalf of the user device, the electronic template notifying the user device of the human perceptibility of the change to the network configuration parameter.

16. The memory device of claim 15, wherein the operations further comprise determining the change in an increased bandwidth satisfies the range of values defining the human perceptibility.

17. The memory device of claim 15, wherein the operations further comprise determining the change in a congestion in the communications network satisfies the range of values defining the human perceptibility.

18. The memory device of claim 15, wherein the operations further comprise determining the change in a wireless signal strength satisfies the range of values defining the human perceptibility.

19. The memory device of claim 15, wherein the operations further comprise determining the change in a wireless interference satisfies the range of values defining the human perceptibility.

20. The memory device of claim 15, wherein the operations further comprise retrieving the electronic template that is electronically associated with a cellular communications tower.

* * * * *